(No Model.)

J. STRASSBURGER.
LACE FASTENER.

No. 537,496. Patented Apr. 16, 1895.

WITNESSES

INVENTOR

UNITED STATES PATENT OFFICE.

JULIUS STRASSBURGER, OF ALLEGHENY, PENNSYLVANIA, ASSIGNOR TO ADALINE W. STRASSBURGER, OF SAME PLACE.

LACE-FASTENER.

SPECIFICATION forming part of Letters Patent No. 537,496, dated April 16, 1895.

Application filed July 13, 1894. Serial No. 517,440. (No model.)

*To all whom it may concern:*

Be it known that I, JULIUS STRASSBURGER, of Allegheny, in the county of Allegheny and State of Pennsylvania, have invented a new and useful Improvement in Lace-Fasteners, of which the following is a full, clear, and exact description, reference being had to the accompanying drawings, forming part of this specification, in which—

Figure 1:
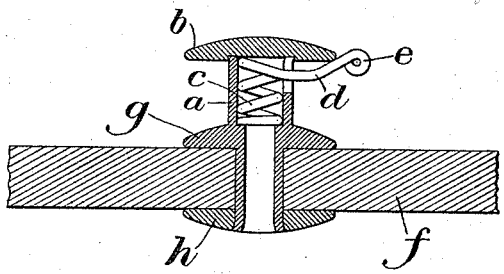
Figure 2:
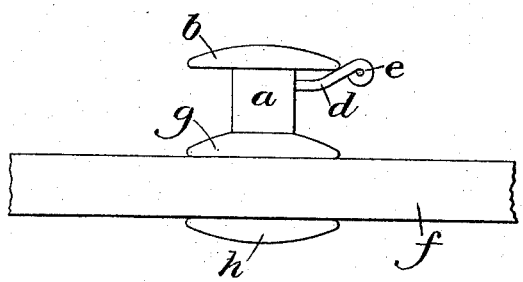

Figure 1 is a vertical sectional view of my improved lace-fastener, and Fig. 2 is a side view of the same.

My invention relates to the fasteners employed in holding and securing the laces or cords used in shoes, gloves, parcel holders, and other articles.

In the drawings, $a$ represents the hollow shank of the fastener to which is secured the head or button $b$. Within this hollow shank is seated a coiled spring $c$, one end of which projects radially from the shank through a slot therein forming the spring-finger $d$, which curves upwardly toward or against and beyond the base of the button $b$, and is preferably provided at its end with a knob $e$. The fastener is secured to the fabric $f$, or article in connection with which it is to be used, by the disks $g$ and $h$, or in any other suitable manner.

In using this device, the lace is first passed around the shank of the fastener between the spring-finger $d$ and the disk $g$, two turns being preferably taken, and then the lace is passed between the head or button $b$ and the spring-finger $d$, which effectually secures the lace.

The advantages of my invention will be apparent to those skilled in the art. The spring is perfectly secured to the fastener so as to exert a positive spring pressure. It is covered by the shank, out of the way, and is not liable to become broken or displaced. The shape and form of the fastener, the spring, and the finger may be modified to suit the purpose for which the fastener is intended.

What I claim, and desire to secure by Letters Patent, is—

1. A lace-fastener having a hollow shank, and a spring-finger, the body of the finger being coiled in the recess of the shank, substantially as described.

2. A lace-fastener consisting of a hollow shank, a button, a spring coiled in the recess of the shank, and a finger extending radially from the coil and toward the periphery of the button, substantially as described.

3. A lace fastener having a hollow slotted shank and a spring-finger having an end fixed in the hollow shank and projecting through the slot therein; substantially as described.

In testimony whereof I have hereunto set my hand.

JULIUS STRASSBURGER.

Witnesses:
W. B. CORWIN,
H. M. CORWIN.